United States Patent [19]

Hosch et al.

[11] 4,213,424
[45] Jul. 22, 1980

[54] SMALL ANIMAL HOLDER

[76] Inventors: Carl A. Hosch; Michael L. Hosch, both of R.R. 2, Parkersburg, Iowa 50665

[21] Appl. No.: 941,124

[22] Filed: Sep. 11, 1978

[51] Int. Cl.² .............................................. A01K 29/00
[52] U.S. Cl. ...................................... 119/98; 119/103
[58] Field of Search ................... 119/98, 99, 100, 103; 17/44, 44.3; 248/121

[56] References Cited

U.S. PATENT DOCUMENTS

| 1,401,393 | 12/1921 | Cross | 119/103 |
| 1,445,487 | 2/1923 | Clark | 119/103 |
| 3,737,137 | 6/1973 | Sheehan | 248/121 X |
| 4,059,869 | 11/1977 | Dunstheimer | 119/103 X |

FOREIGN PATENT DOCUMENTS 841679 6/1952 Fed. Rep. of Germany .......... 248/121

Primary Examiner—Louis G. Mancene
Assistant Examiner—Robert P. Swiatek

[57] ABSTRACT

A holder for small animals including a yoke adapted to extend partially around the neck of the animal and narrow enough so that the animal will hang by the neck without the head pulling through the yoke, and a pair of lower restraining arms adapted to extend along the sides of the animal to prevent swinging of the body. The arms are adjustable vertically and spring loaded laterally so that the body of the animal is closely held. Fingers may be provided on the arms to hold the hind legs of the animal.

8 Claims, 3 Drawing Figures

SMALL ANIMAL HOLDER

BACKGROUND AND SUMMARY OF THE INVENTION

Very young domesticated animals are treated for various reasons. For example, the tails of young lambs are usually docked; the ears of small pigs are frequently marked, navels of both often need cleaning and trimming; teeth are clipped to prevent injury to other young animals from fighting; most young animals are vaccinated against certain diseases; and young male animals are often castrated. In all of these operations it is necessary to hold the animal securely and generally with the belly exposed.

A number of devices have been proposed to hold the animal. Probably the most common is a simple trough-like device into which the animal is laid. One person holds the animal's legs while another performs whatever procedure is necessary. Other devices include a tong-like means mounted on a post. The tong is engaged around the animal's abdomen just forward of the hind legs and the animals dangles head down. Still others include various devices to hold the animal in a trough, and others to hold the animal by its legs.

The devices which use the trough idea usually require some more or less elaborate devices to restrain the animal in the trough. These devices also are difficult to use for tail docking or ear marking because the upper part of the back and head of the animal rests in the trough.

Those devices which suspend the animal also require somewhat complicated means to grasp the body or legs of the animal. Further, none of the devices known to us has any restraint for the body of the animal beyond the suspension means.

By our invention, we provide a convenient and effective means of holding the animal in good restraint for all the operations noted above. The animal can be quickly placed in, and removed from the device so that routine procedures can be done rapidly on large numbers of animals. And special convenient holders are provided to hold the animal in proper position for easy castration. It may also be noted that our device is completely safe. No great pressure is put on any vital parts of the body of the young animal such as joints, abdomen, or chest cavity. Instead, there is a short time suspension by the neck which is a very safe method of holding.

FIGURES

DESCRIPTION

Figure 1:
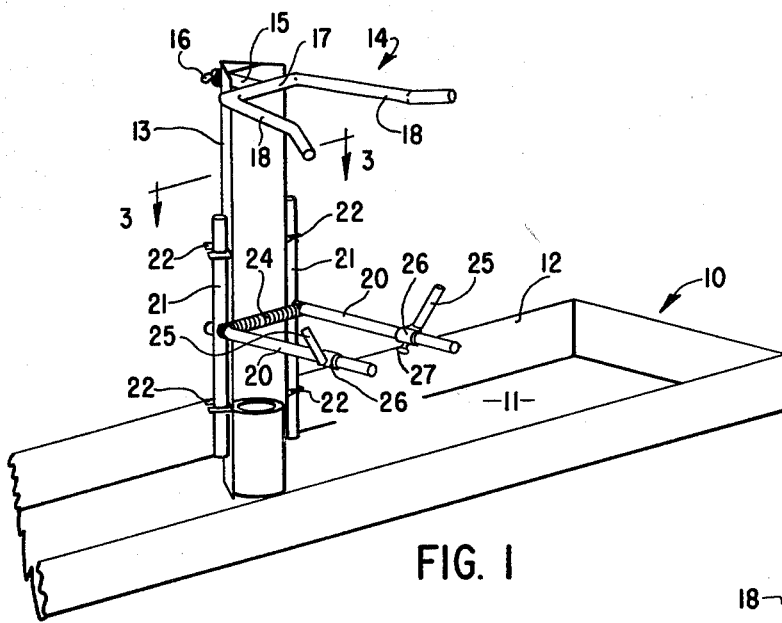
FIG. 1 is a pictorial view of the holder.

Briefly our device is a holder for small animals which includes a support mounted on a base. A yoke adapted to receive the animal's neck is provided at the top of the post and adjustable restraint means are mounted further down on the support so that the body of the animal will be restrained.

More specifically and referring to the drawings, we provide a base 10 which is preferably in the form of a tray having a bottom surface 11 and flanged walls 12. The tray is preferably relatively long and narrow. For use with young pigs, we have found it convenient for the tray to be of such length that it may be supported from the walls of a typical farrowing crate or pen.

Mounted on the tray 10 is a post 13. As illustrated, the post 13 is composed of a section of tube or pipe welded to the tray and an angle iron member extending upwardly from the tube. This is only one possibility, and it may be desirable to weld the angle iron directly to the tray, or to use some other type of fabricated post. For example, it would be possible to make the post removable simply by providing a socket on one part and a tang on the other to fit into the socket. Pins or set screws could be used to hold the tang in place in the socket. All of this is well understood in the art. In any case, the post should be tall enough so that the body of the largest animal to be treated will not be longer than the distance from the top of the post 13 to the tray 10.

Figure 2:
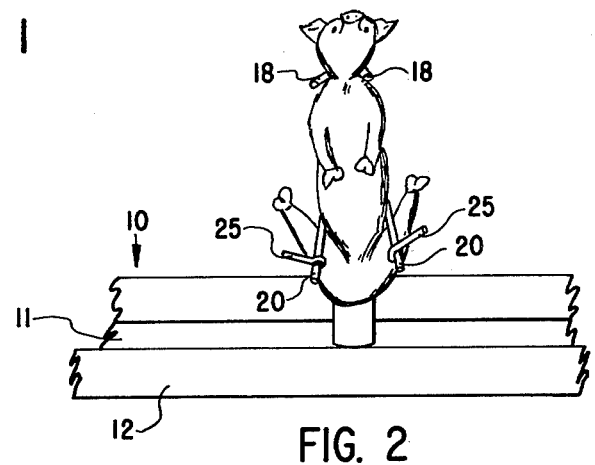
FIG. 2 is a view of the device showing an animal held therein.
Figure 3:
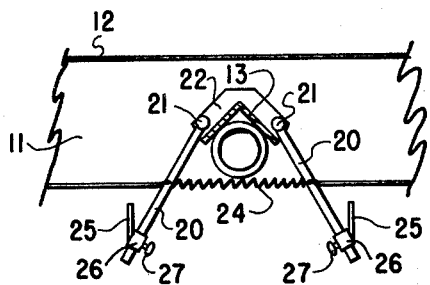
FIG. 3 is a sectional view from line 3—3 of FIG. 1.

At the top of the post 13 we provide a yoke 14. This yoke includes a mounting pin 15 adapted to extend through a hole in the post 13. The pin 15 may be screw threaded and held to the post 13 by a wing nut 16 or the like. A cross member 17 extends crossways of the pin 15 and terminates in extending members 18. The members 18 taper outwardly slightly from the cross member 17 and are bent considerably further outwardly near their ends. This form provides easy means for inserting the neck of the animal so that the animal will hang from the yoke as shown in FIG. 2.

For some operations, just a yoke of the type described might be sufficient. However, we have learned that most animals swing rather vigorously when hung from the yoke 14 alone. Therefore, we provide restraining means for the body of the animal.

This restraining means includes a pair of arms 20 extending from vertical slide members 21. The slide members 21 are slidably mounted in ears 22 fixed to the post 13. The ears are set so that while the members 21 can slide through them, there will be a binding action if the sliding force is not vertical. In effect, this allows the vertical position of the arms 20 to be slidably adjusted vertically. An eccentric force, however, will cause binding between the ears 22 and the member 21 to keep the arms 20 in an adjusted position against normal forces of roughly the magnitude of the weight of the animal to be held. The slide members 21 are also rotatable within the ears 22 so that the arms can be pivoted outwardly to embrace the sides of the animal being worked on. A tension spring 24 engaged between the two arms 20 tends to pull them together, and will hold the arms adjacent the body of the animal (see FIG. 2).

For certain operations—especially castration—it may be necessary to hold the rear legs of the animal. For that purpose we provide fingers 25 adjustably mounted on the arms 20. The fingers 25 are mounted so as to form a V-shape with the arms 20 with the apex of the V being away from the support post 13. These fingers include a collar 26 slidably surrounding the arm 20. A thumbscrew 27 threaded into the collar and adapted to press against the arm 20 provides means for holding the finger in any adjusted position. The use of the fingers 25 in holding the animal's hind legs is also best illustrated in FIG. 2.

The use of the device will be evident from the foregoing description and the figures. For some types of procedures, it may not be necessary to use the fingers 25 to hold the hind legs, but for castration especially, such holding is highly desirable. It should also be noted that removal of the yoke 14 from the post 13 is a simple process of removing the wing nut 16. Also that each arm 20 can be removed by sliding the member 21 upward so that it is free of the lower ear 22 and then downward enough to remove the member 21 from the upper ear. Also that the fingers can be easily slid off the ends of the arms 20. Thus dismantled, cleaning is a relatively easy process.

We claim as our invention:

1. A holder for a small animal comprising a base, support means mounted on said base and extending upwardly therefrom, yoke means adapted to receive the neck of said animal mounted on said support means and vertically spaced from said base whereby said animal can be suspended in said yoke means, arm means pivotally mounted on said support means between said yoke means and said base, said arm means being thereby adapted to engage the sides of said animal to hold the animal steady in said yoke with said arm means being swingable so that the space between them is variable to provide for varying sizes of animals, and with said arms being biased toward each other.

2. The device of claim 1 in which said arms are mounted so as to be vertically adjustable on said support means.

3. The device of claim 1 in which the arms are biassed toward each other with a tension means.

4. The device of claim 1 in which said support means is a post, said arm means including vertical slide members, ear means on said post adapted to receive said slide members whereby said slide members are vertically adjustable as well as pivotally mounted so that said arm means can be located at various vertical levels.

5. The device of claim 4 in which said base comprises a tray.

6. The device of claim 4 in which said yoke means is removably mounted said post and said slide members are readily removable from said ears whereby the device can be easily dismantled for cleaning.

7. The device of claim 1 which finger means are provided on said arm means said fingers forming a V-shape with said arm means, said V having the apex away from said support means whereby the hind legs of said animal may be held in said V-shape.

8. The device of claim 7 in which said finger means are adjustably mounted on said arm means.

* * * * *